United States Patent [19]
Ming-Yen

[11] Patent Number: 5,796,373
[45] Date of Patent: Aug. 18, 1998

[54] COMPUTERIZED STEREOSCOPIC IMAGE SYSTEM AND METHOD OF USING TWO-DIMENSIONAL IMAGE FOR PROVIDING A VIEW HAVING VISUAL DEPTH

[75] Inventor: Lin Ming-Yen, Taipei, Taiwan

[73] Assignee: Artificial Parallax Electronics Corp., Taipei, Taiwan

[21] Appl. No.: 729,247

[22] Filed: Oct. 10, 1996

[51] Int. Cl.$^6$ .................................................. G09G 5/00
[52] U.S. Cl. .......................................... 345/6; 348/56
[58] Field of Search ............................. 348/56, 51, 53, 348/54, 55; 345/7, 4, 6, 87, 302, 419

[56] References Cited

U.S. PATENT DOCUMENTS

| | | | |
|---|---|---|---|
| 4,424,529 | 1/1984 | Roese et al. | 348/56 |
| 4,870,600 | 9/1989 | Hiraoka | 348/56 |
| 4,979,033 | 12/1990 | Stephens | 348/56 |
| 5,654,749 | 8/1997 | Kanno | 348/56 |

*Primary Examiner*—Dennis-Doom Chow
*Attorney, Agent, or Firm*—W. Wayne Liauh

[57] ABSTRACT

A computerized stereoscopic image system and a method of using two-dimensional images with multi-layer for providing a view having a visual depth are disclosed. The stereoscopic image system includes a computer, a main memory unit, a VGA graphic card, a monitor, an external shutter synchronizer, and a LCD shutter eye-glasses. The method of using two-dimensional images with multi-layer for providing a view having visual depth is done by using a binocular shift and sequential displays of stereoscopic images on a monitor in such a manner that, as soon as the user puts on a pair of LCD-shutter eye-glasses, he or she will see a stereoscopic image.

8 Claims, 12 Drawing Sheets

| focal plane | left eye image | right eye image | picture |
|---|---|---|---|
| a | ▨ | ▦ | ▨ |
| b | ● | ⊕ | ◉ |
| c | ◆ | ◇ | ◇ |

FIG. 10B

COMPUTERIZED STEREOSCOPIC IMAGE SYSTEM AND METHOD OF USING TWO-DIMENSIONAL IMAGE FOR PROVIDING A VIEW HAVING VISUAL DEPTH

BACKGROUND OF THE INVENTION

1. Field of the Invention

This invention relates to a computerized stereoscopic image system and a method of using two-dimensional image for providing a view having visual depth, and particularly to using a personal computer to provide a stereoscopic display hardware system by means of a shutter-type stereoscopic eye-glasses, and by means of a method of using two-dimensional image for providing a view having visual depth; a user can see a stereoscopic view instead of seeing a conventional plane image in terms of visual sense.

2. Description of the Prior Art

During the era of advanced technology and multi-media, the technology of stereoscopic image has become a popular topic, and particularly in the personal computer system. By means of a 3D (three-dimensional) software system, and by using a shutter-type stereoscopic eye-glasses, a polarized light stereoscopic eye-glasses, or a head mounted display, a user can see a stereoscopic image on the screen of a computer. In order to keep up with the popularity of such technology, all industries of the kind have started to have the hardware system for stereoscopic displaying technique combined with the software system so as to provide a stereoscopic image display. For instance, in the market of the electronic game software, the image display has been advanced into 3D display or even into stereoscopic display instead of the conventional 2D (two-dimensional) display. Regarding the technology of making a screen scene, the technique of scene for a 2D image is usually done by an artist, who mill arrange all objects painted for the scene on a 2D plane. Regarding the 3D or stereoscopic techniques, it is quite different from that for the 2D method, i.e., a 3D drawing technique is used by projecting all objects on a screen to obtain a 3D scene picture. In brief, the objects of a 2D scene are displayed with plane views; the objects in a 3D scene are represented with geometric models. In a 2D plane screen, the artist usually illustrates a visual depth by arranging a background and a main scene at different depth layers; every depth layer is displayed with a 2D picture; then, all the scenes in every depth layer are combined into a montage scene so as to form into a multi-depth layer scene to be visualized by the user. Although a user would feel a depth among the depth layer, the 2D views in every depth layer are, in fact, superimposed on a same plane, and they are unable to provide a 3D depth effect; therefore, the conventional 2D technique for the electronic game program or other software scene is unable to be used in the 3D technique; in other words, when making a software for a scene, a 3D drawing technique can be used to display a stereoscopic image; the conventional 2D software prepared is useless for stereoscopic display, and the 2D software is deemed a waste.

In order to overcome the aforesaid problem, this invention has combined a software and hardware techniques to provide a stereoscopic display effectively, i.e., a 2D image with multi-depth layer of a 2D software can be converted into a 3D image with stereoscopic effect so as to maintain the commercial opportunity of the 2D software, and to maintain the vast of a softway marketability thereof.

SUMMARY OF THE INVENTION

The prime object of the present invention is to provide a method of displaying a stereoscopic image (a field sequential display method) by means of binocular principle and a monitor so as to have the depth layers of a 2D plane image emphasized, and also to have all objects in the main scene stood out from the surface thereof; then, by using the hardware system of the stereoscopic display method, a user can see a vivid stereoscopic image.

Another object of the present invention is to provide method, in which a left and a right images are to be displayed continuously on a monitor by means of an alternating scanning technique (a field sequential method), and by using a LCD shutter eye-glasses to obtain a synchronization between the switching time (for the transparent and opaque variation) and the displaying time of a monitor, i.e., at a given moment, when a left image is displaying on the monitor, the left LCD shutter of the eye-glasses is in transparent state, while the right LCD shutter is in opaque state. At another moment, when a right image is displaying in the monitor, the right LCD shutter of the eye-glasses is in opaque state, while the left LCD shutter of the eye-glasses is in opaque state; a user can only see a right image through the right eye; since the alternating display time between the left image and the right image is shorter than the persistence of vision, a use can see a stereoscopic image.

Still another object of the present invention is to provide a method, in which the stereoscopic view takes place by using the theory of binocular principle; when a person sees an object, the viewing angle of the two eyes is different, and therefore the images formed on the retinas of two eyes are also different (i.e., the left eye sees a left image, while the right eye sees a right image); a person's brain system feels the depth of a stereoscopic image in accordance with the difference between the images saw with the two eyes. According to the aforesaid visual difference, two images (left and right images) are made first, and then the two images are displayed on the monitor alternately; when a user puts on the stereoscopic shutter eye-glasses according to the present invention, the user will see a stereoscopic scene on the plane screen of the monitor.

A further object of the present invention is to provide a method, in which the two same 2D images are set in a suitable shift in accordance with the theory of binocular between two eyes so as to obtain a stereoscopic image having different depths.

BRIEF DESCRIPTION OF THE DRAWINGS

FIG. 10b illustrates a left image, a right image and a picture as shown in FIG. 10a.

DETAILED DESCRIPTION

Figure 1:
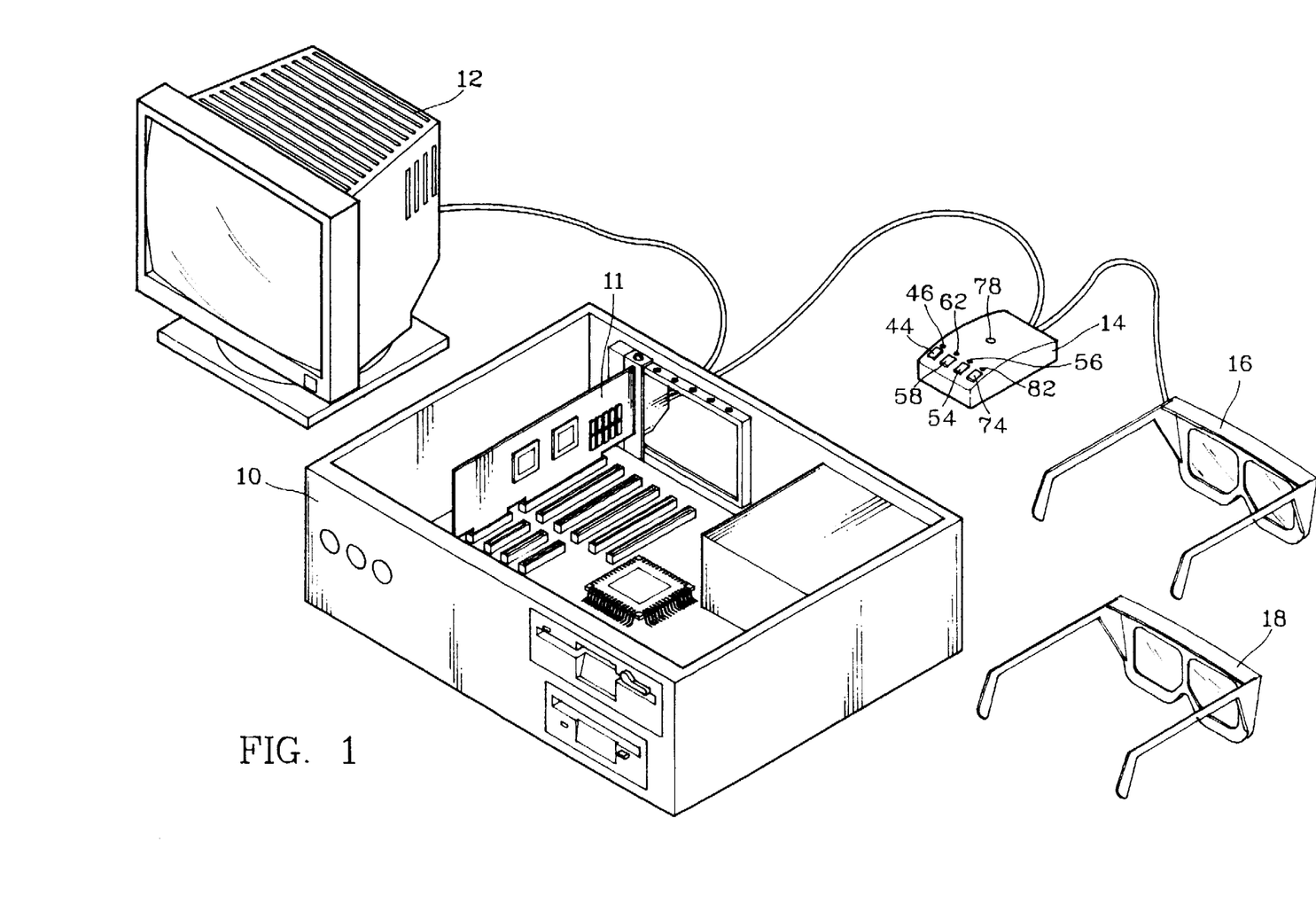
FIG. 1 is a perspective view of an embodiment according to the present invention.

Referring to FIG. 1, it is a perspective view of the stereoscopic system according to the present invention comprising a main frame 10, a monitor 12, a VGA drawing card 11, an external shutter synchronizer 14, a wired LCD shutter eye-glass 16 and a wireless LCD shutter eye-glass 18. The external shutter synchronizer 14 is used for controlling the synchronization between the image-displaying time of the left and right images of the monitor 12 and the switching time of the LCD shutter eye-glasses 16 and 18; the electronic circuit of the external shutter synchronizer 14 may be furnished separately, and it may also be installed in the peripheral equipment of the main frame 10, such as the VGA drawing card 11, a mouse controller, a control rod, and a keyboard, etc.

Figure 2:
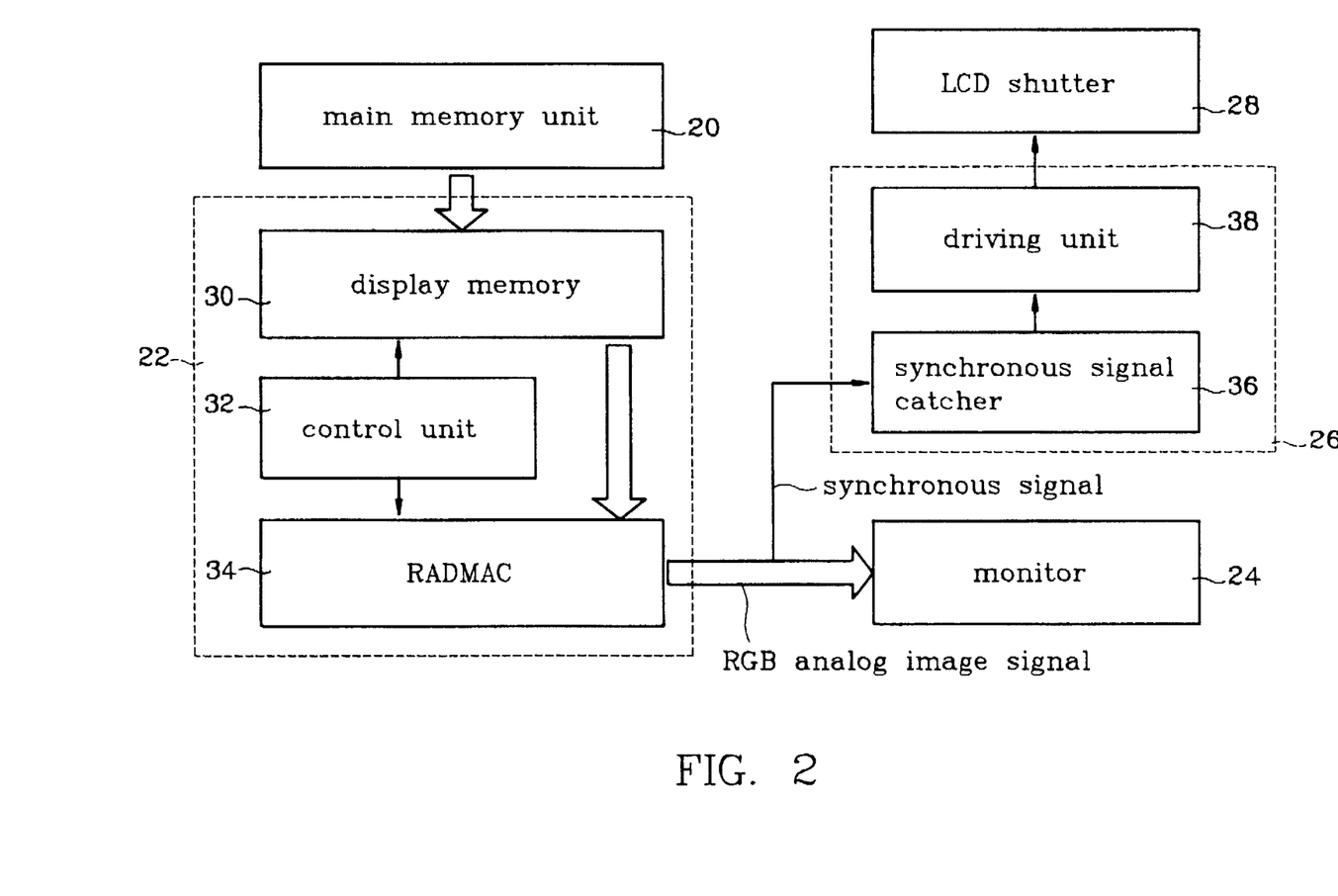
FIG. 2 is a block diagram of a stereoscopic system of the embodiment according to the present invention.

Referring to FIG. 2, it is a block diagram of the stereoscopic image system, which comprises a main memory unit 20, a VGA drawing card 22, a monitor 24, an external shutter synchronizer 26 and a LCD shutter 28; the VGA drawing card 22 includes a display memory 30, a control unit 32 and a RADMAC 34. The external shutter synchronizer 26 includes a synchronous signal catcher 36 and a driving unit 38. First, a left image and a right image from the main memory unit 20 are sent into the display memory 30 of the VGA drawing card 22; then, this image is converted into RGB analog signals by RADMAC 34 and sent to monitor 24; through the monitor 24, the left and right images are displayed on a screen alternately. Further, in order to obtain a synchronization between the switching time of the left and right shutters on the eye-glasses and the image-displaying time of the left and right images on the screen, the synchronous signal catcher 36 of the external shutter synchronizer 26 must catch the RGB synchronous signals upon the RGB electric signals being sent out simultaneously. The synchronous signal catcher 36 is used for sending a such signal to the driving unit 38 for driving the left add right switches of the LCD shutter 28 so as to obtain synchronization between the image-displaying time of the left and right images on the monitor 24 and switching time of the left and right shutter switches of the shutter eye-glasses.

Figure 3:
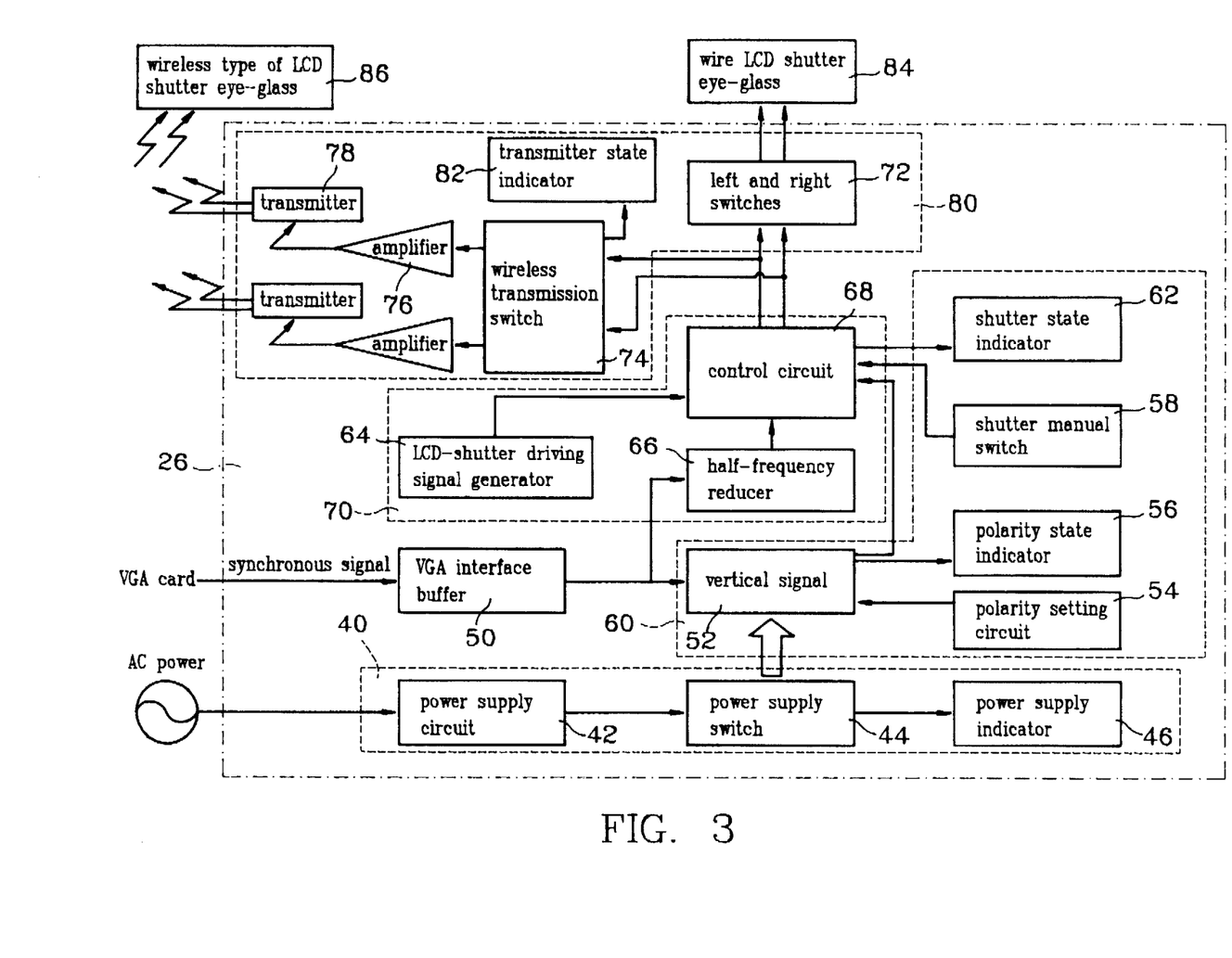
FIG. 3 is a block diagram of an external shutter synchronizer of the embodiment according to the present invention.

Referring to FIG. 3, it is a block diagram of the external shutter synchronizer according to the present invention, which includes a power supply unit 40, a VGA interface buffer 50, a shutter switch assembly 60, a shutter controller 70 and a shutter-driving signal output unit 80; the power supply unit 40 includes a power supply circuit 42, a power supply switch 44 and a power supply indicator 46; the prime function of the power supply unit 40 is to provide the external shutter synchronizer 26 with a D.C. (direct current) because that the external shutter synchronizer 26 is separated from the computer, and is unable to use the power supply of the computer. The external A.C. power supply is connected with the power supply circuit 42, from which a D.C. power supply will flow through the power supply switch 44 to the external shutter synchronizer 26. The power supply indicator 46 is used to let a user know the power supply condition. The power supply circuit 42 may also be provided outside the external shutter synchronizer 26. The VGA interface buffer 50 is used for isolating the electrical characteristics between the VGA drawing card and the external shutter synchronizer 26 so as to prevent the VGA signal from distortion upon being interfered by the external shutter synchronizer 26. The VGA interface buffer 50 is used for receiving an output synchronous signal (a vertical synchronous signal and a horizontal synchronous signal) from the VGA drawing card, and then amplifies the same before being transmitted to the shutter switch unit 60 and the shutter controller 70 respectively. The shutter switch unit 60 includes a polarity detector of vertical synchronous signal 52, a polarity setting circuit 54, a polarity state indicator 56, a shutter manual switch 58 and a shutter state indicator 62; the shutter switch unit 60 includes two types, i.e., an automatic type and a manual type, of which the function is to allow or to prohibit a LCD shutter driving signal to send out. The automatic type of the shutter switch unit includes a polarity detector of vertical signal 52, a polarity setting circuit 54, and a polarity state indicator 56. The polarity detector of vertical signal 52 uses a horizontal synchronous signal to lock and to detect the positive or negative of a vertical synchronous signal; simultaneously, the detected result thereof will be compared with the present reference polarity (set by means of a polarity setting circuit 54). If the comparison shows no difference, an enable signal will be sent to the shutter controller 70, and the shutter controller 70 will send out a shutter-driving signal; if the comparison shows a difference, a disable signal will be sent to the shutter controller 70 to prohibit a shutter-driving signal to send out. Either the enable or disable signal will also be sent to the polarity state indicator 56 simultaneously so as to enable a user to know the polarity state. According to the manual type of the shutter switch unit 60, the aforesaid two signals (Enable or disable signal) will go through the shutter manual switch 58 to control the output of the shutter-driving signal; then, a user can know the using condition of a shutter-type stereo-eye-glass. The shutter controller 70 includes a LCD-shutter driving signal generator 64, a half-frequency reducer 66 and a control circuit 68. The prime function of the shutter controller 70 is to send out a left and right LCD-shutter driving signals in accordance with the vertical synchronous signal of the VGA drawing card so as to obtain a synchronization between switching time of the left and right LCD shutters and the image-displaying time of the left and right images on the monitor. The enable and disable signals out of the shutter switch unit 60 are used for driving or not driving the LCD shutter.

Figure 4:
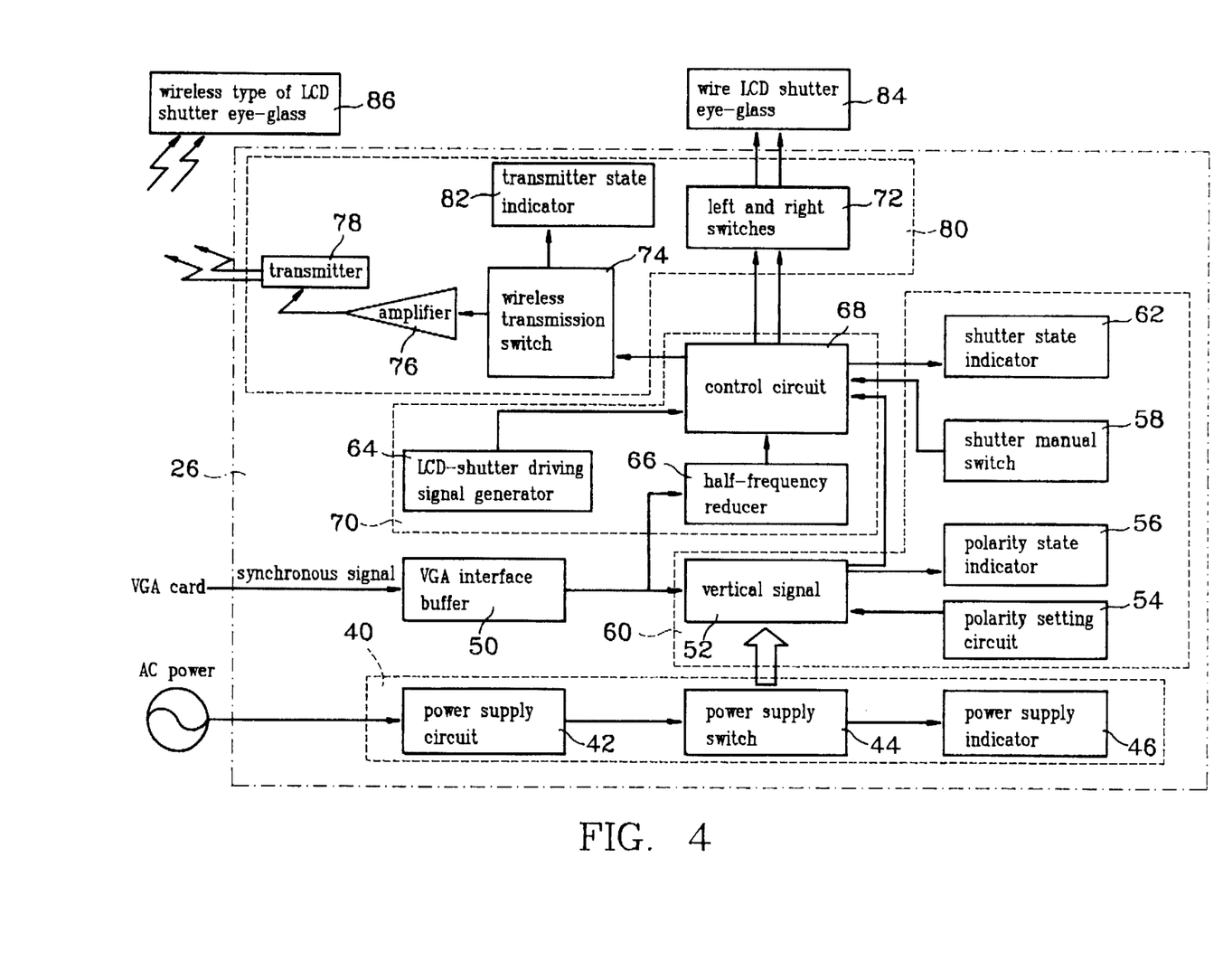
FIG. 4 is a block diagram of another embodiment of the external shutter synchronizer according to the present invention.
Figure 5:
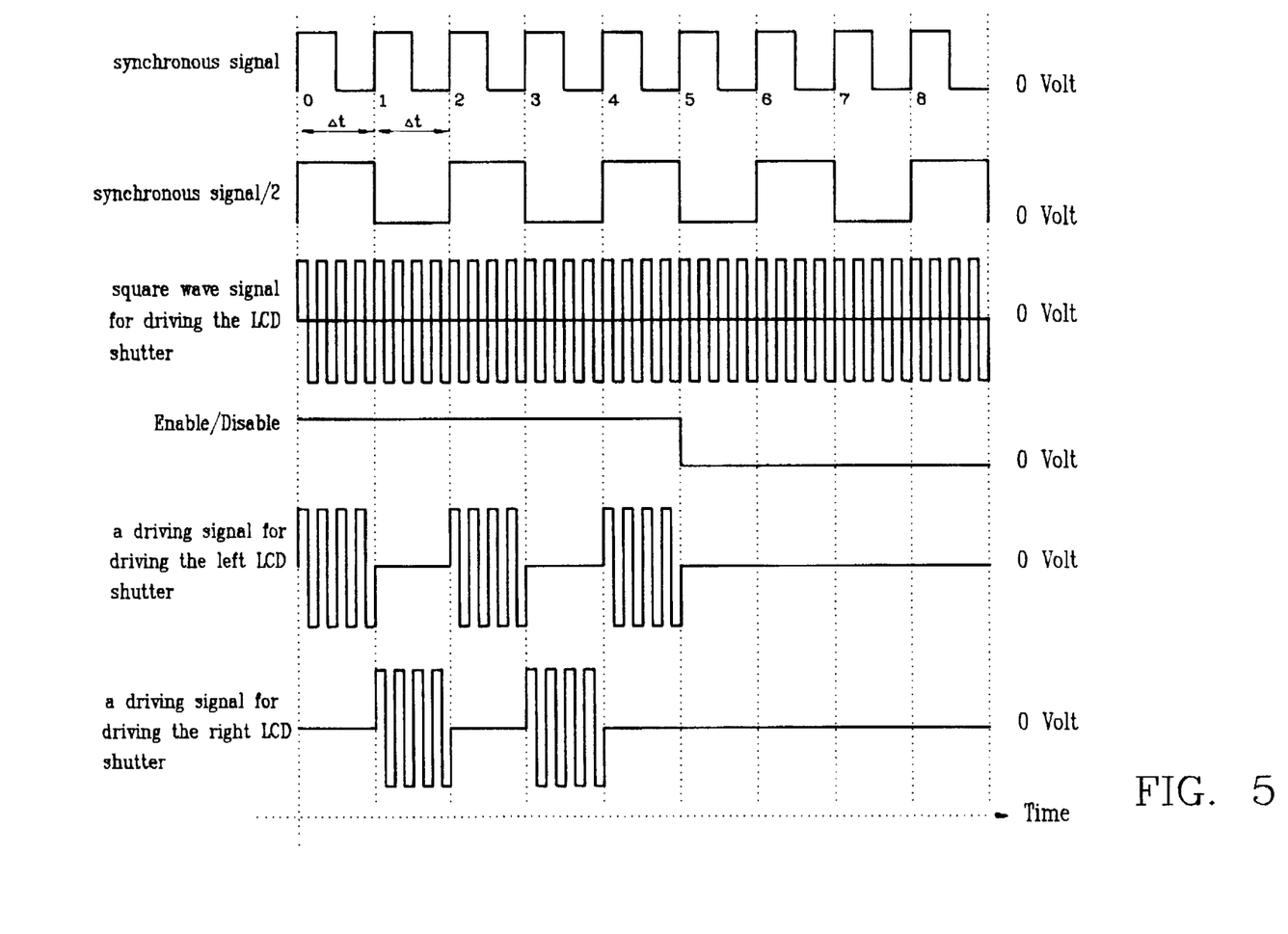
FIG. 5 illustrates the input-output signals of an embodiment of a shutter controller according to the present invention.

As shown in FIG. 5, the input and output signals of the shutter controller are illustrated (i.e., showing the operation of the shutter synchronizer); as shown in FIGS. 3 and 4, the vertical synchronous signals are sent out of the VGA interface buffer regularly (the time length indicates the output order of the signals); first, suppose the even-number synchronous signal generated with the VGA drawing card, represents a left image, while the odd-number vertical synchronous signal generated with the VGA drawing card will represent a right image, and vice versa. αt represents the time length of an image to scan. Suppose that when the driving voltage is zero, the LCD shutter is in transparent state, the LCD shutter will be in opaque state upon the driving voltage being higher than zero (the square wave signal for the LCD shutter), and vice versa. First, a vertical synchronous signal is sent to a half-frequency reducer 66 to reduce the frequency of the vertical synchronous signal to 50% thereof (the vertical synchronous signal 12), and then the aforesaid signal is sent to the control circuit 68 so as to have the vertical synchronous signal 12 appeared two times within one cycle thereof, i.e., a left and right images will be scanned regularly (first left and then right) to display on the monitor; then, a square wave signal for driving the LCD shutter generated with the LCD-shutter driving signal generator 64 and an Enable and Disable signals out of the shutter switch unit 60 will also be sent to the control circuit 68. If the signal is in an enable state and the vertical synchronous signal is in even-number state, the control circuit will send the LCD-shutter driving signal to the right LCD shutter to cause the right LCD shutter to be in opaque state; then, a zero voltage will be applied to the left LCD shutter so as to have the left LCD shutter to be in transparent state. When a user is put on a LCD shutter eye-glasses, the user's left eye can only see a left image, while the user's right eye can see nothing. Likewise, if the signal is in enable state, and the vertical synchronous signal is in odd-number state, the control circuit will send a LCD driving signal to the left LCD shutter to cause the left LCD shutter to be in opaque state; then, a zero voltage will be applied to the right LCD shutter so as to have the right LCD shutter to be in transparent state. As soon as a user putting a LCD shutter eye-glasses on, he (or she) will see the right image with the right eye, while the left eye can see nothing. When the signal is in disable state, the control circuit will send a zero voltage to the left and right LCD shutters simultaneously so as to set the left and right LCD shutters in transparent state, i.e., they can see left and right images upon putting on the LCD shutter eye-glasses; in other words, the user would feel no difference to put on the LCD shutter eye-glasses or not to put on the same, i.e., the LCD shutter eye-glasses being not in use.

As shown in FIG. 3, the shutter-driving signal output unit 80 includes the left and right switches 72, a wireless transmission switch 74, an amplifier 76, a transmitter 78, and a transmitter state indicator 82. The function of the unit 80 is, according to a wire signal, to send a LCD shutter driving signal generated with the shutter controller 70 to the wired LCD shutter eye-glass 84, or is to send a LCD shutter driving signal generated with the shutter controller 70 to the wireless LCD shutter eye-glass 86 according to a wireless type signal. According to the wire method, the LCD-shutter driving signal will directly be sent to the wired LCD shutter eye-glass 84. However, the hardware system of the present invention is unable to distinguish a vertical synchronous signal to be a left side or right side one, i.e., the hardware system of the present invention is unable to know a vertical synchronous signal as shown in FIG. 5 being a left image or a right image sent out of the VGA drawing card; therefore, a left-and-right switch 72 is furnished in the shutter-driving signal output unit 80 so as to switch the transmitting target of a LCD-shutter driving signal. As shown in the aforesaid FIG., the LCD-shutter driving signal out of the left side of the control circuit 68 will be transmitted to the left LCD shutter, the LCD-shutter driving signal out of the right side of the control circuit 68 will be transmitted to the right LCD shutter; however, by using the left-and-right switch 72, a LCD-shutter driving signal out of the left side of the control circuit 68 can also be sent to the right side of the right LCD shutter, and vice versa so as to adjust the displaying sequence of the left and the right images. According to the wireless type method, the left and right LCD-shutter driving signals out of the control circuit 68 will go through the amplifier 76 for amplification, and then go through a transmitter 78 to convert into an infrared signal, a radio wave or a visible light, which is then transmitted to a receiver at remote terminal with a wireless type of LCD shutter eye-glass 86, which will be driven so as to have the LCD shutter switch and an input signal become synchronized. The wireless transmission switch 74 can control the LCD-shutter driving signal to be transmitted or not. The transmitter state indicator 82 is used for indicating a LCD-shutter driving signal to be transmitted or not. The wireless transmitter can also be designed as shown in FIG. 4, in which a vertical synchronous signal 12 out of the control circuit 68 or a half frequency of a vertical synchronous signal will be sent to the amplifier 76; then, a signal amplifier will be sent, from the amplifier, to the transmitter 78 to convert the signal into an infrared signal, or a radio wave, or a visible light before being transmitted to a remote receiver of a wireless LCD shutter eye-glass 86 so as to have the switching of the LCD shutter and an input signal synchronized.

Figure 6:
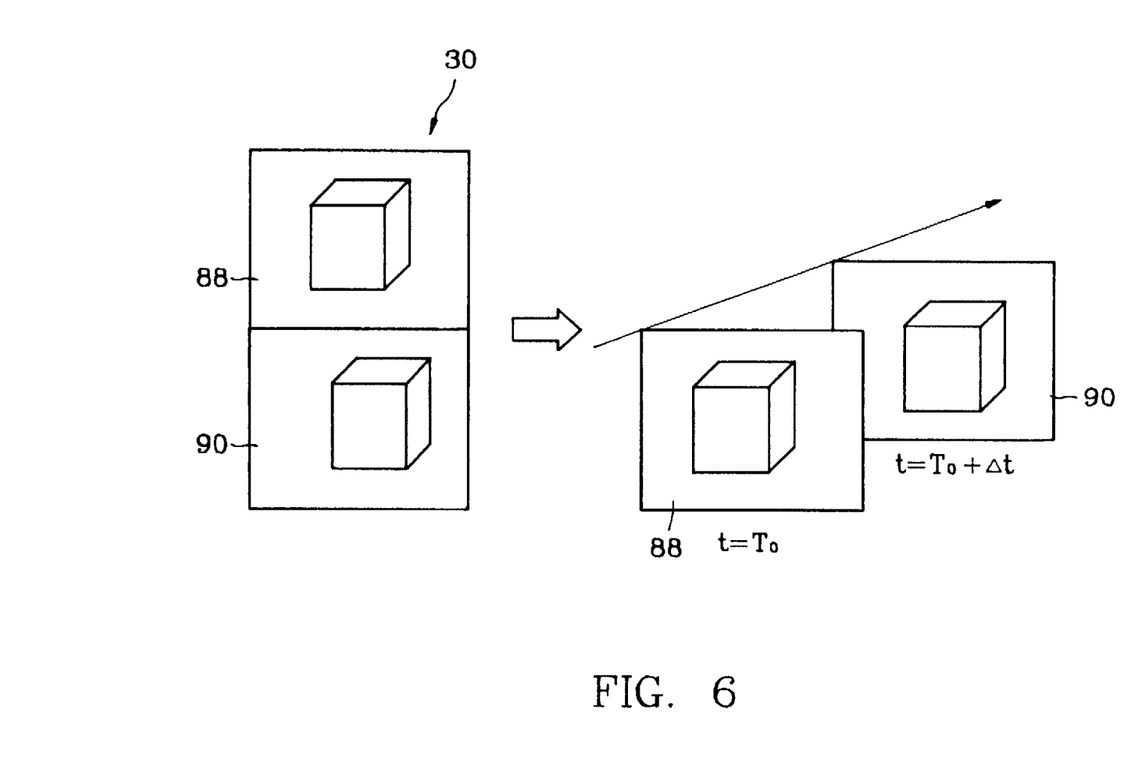
FIG. 6 illustrates a non-interlace image-displaying method according to the present invention.
Figure 7:
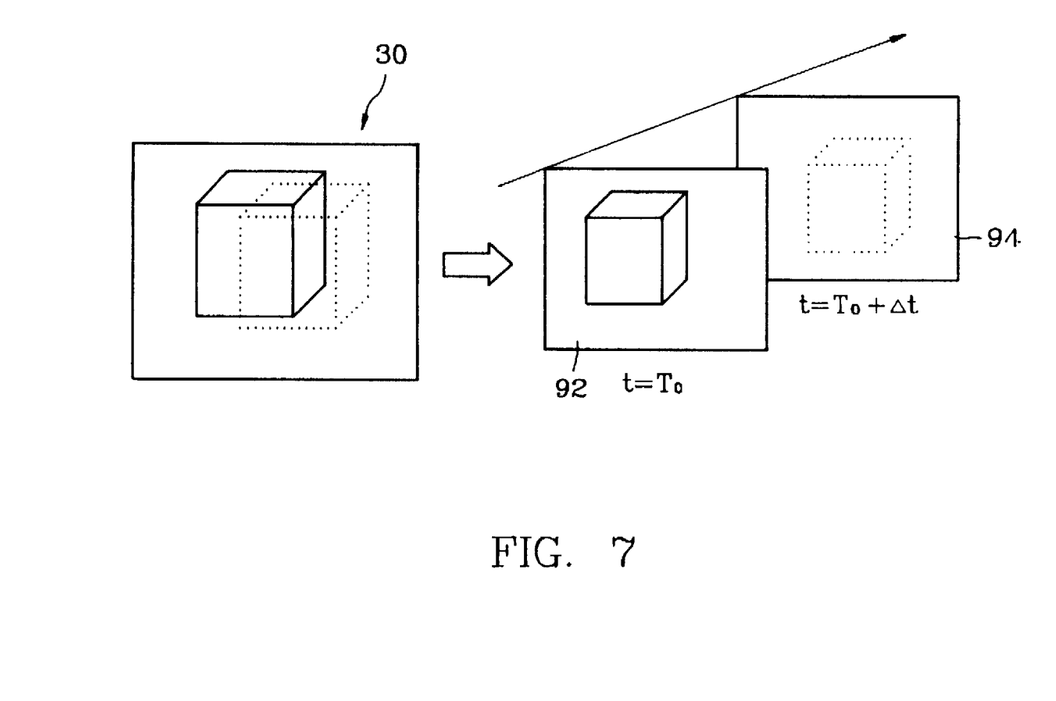
FIG. 7 illustrates an interlace image-displaying method according to the present invention.

Referring to FIG. 6, it illustrates a non-interlace image-displaying method; first, prepare two images (a left and right one) having visual difference therebetween by means of photograph or drawing; put the two (left and right) images 88 and 90 into a display memory 30 of the VGA drawing card; then, by means of the control unit 30 of the VGA drawing card, the left and right images 88 and 90 will go through the RAMDAC, and then the images will be displayed on a monitor screen; within an instant (t=To), the left image 88 will be sent out of the VGA drawing card to display on the monitor screen, and then within another instant (t=To+αt), the right image will be sent out of VGA drawing card to display on the monitor screen. Since both the left and right images 88 and 90 are stored at different positions in the display memory 30 of the VGA drawing card, the VGA drawing card will, by means of a non-interlace method, send out the left and right images 88 and 90 to the monitor. Another method which is opposite to the alternating method is the interlace method, i.e., the left and right images are stored in a way of interleave at a same address in the display memory of the VGA drawing card. By means of the aforesaid method, the VGA drawing card can alternately send out alternating left and right images 92 and 94 (as shown in FIG. 7) to form into a combined picture.

Figure 8A:
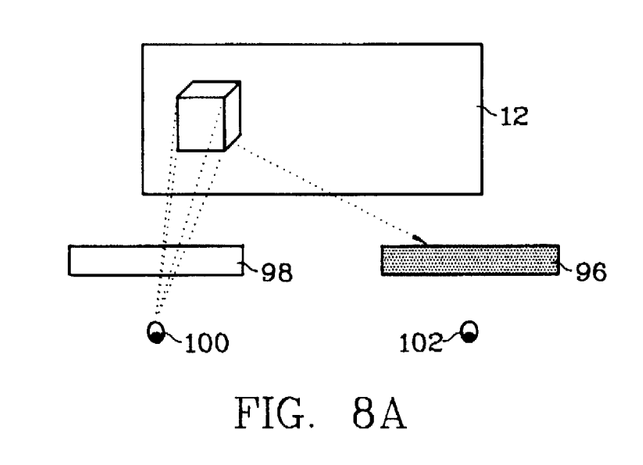
FIGS. 8a, b and c illustrate the operation conditions of the LCD shutter eye-glasses according to the present invention.
Figure 8B:
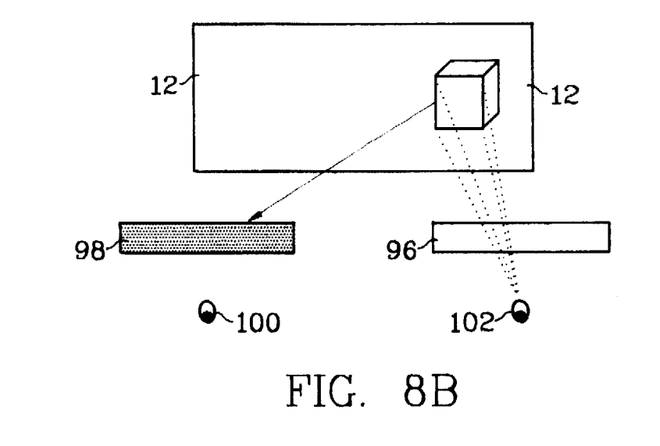
Figure 8C:
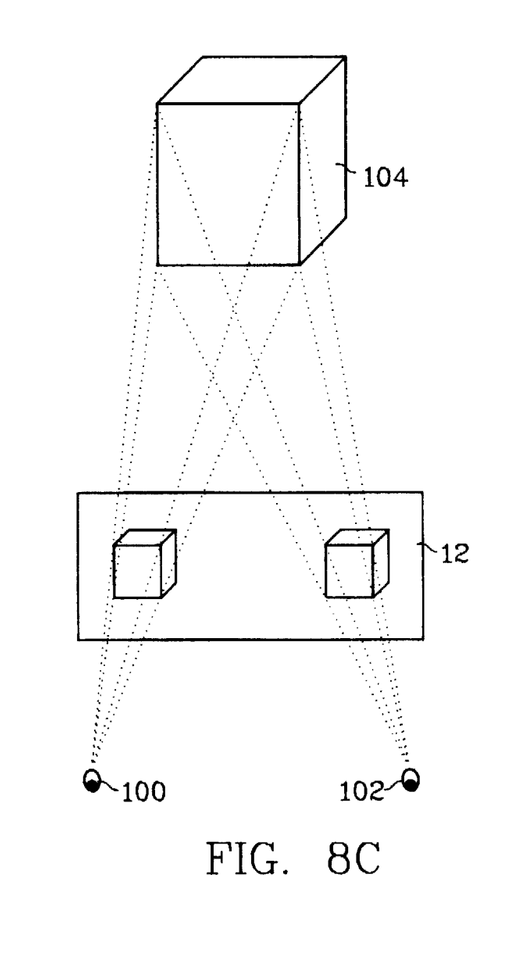

FIG. 8 illustrates the operation conditions of the LCD shutter eye-glasses of the present invention. Within an instant (t=To), the monitor 12 will start to scan and to display the left image so as to have the right LCD shutter 96 set in opaque state, while the left LCD shutter 98 will be set in transparent state; then, only the left eye 100 can see the left image (as shown in FIG. 8a). During the next instant (t=To+αt), the monitor 12 will start to scan and to display the right image so as to have the left LCD shutter 98 set in opaque state, while the right LCD shutter 96 will be set in transparent state; then, only the right eye 102 can see the right image (as shown in FIG. 8b). During the short moment from To to To+2αt (αt being much short than the persistence of vision), a person's left and right eyes 100 and 102 feel seeing the left and right images simultaneously; then, the user's brain system will combine the left and right images into a dummy stereo-montage picture 104 to exist in user's vision (as shown in FIG. 8c).

Figure 9A:
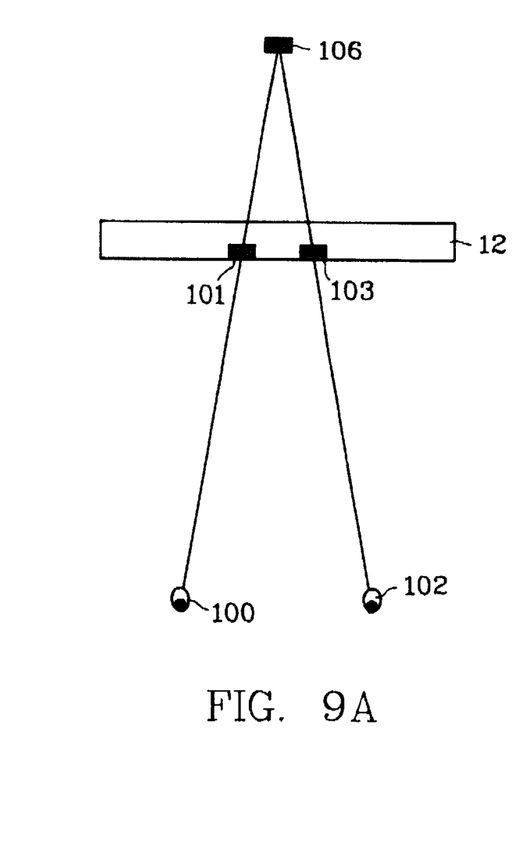
FIG. 9a illustrates a picture sunk into a screen according to the present invention.
Figure 9B:
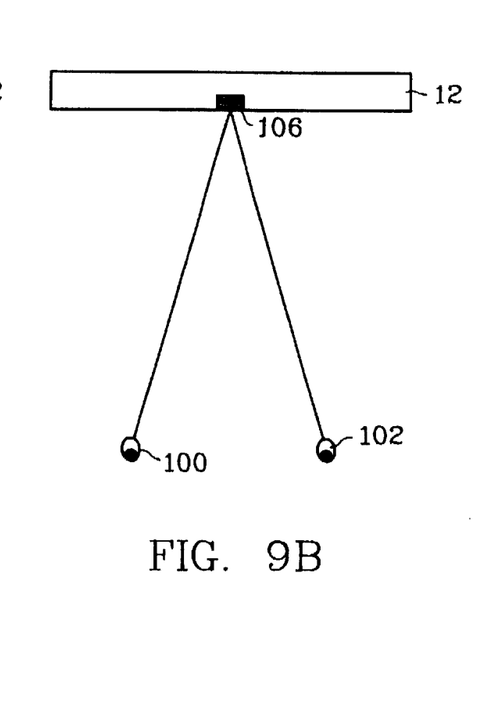
FIG. 9b illustrates a picture projected on the surface of a screen according to the present invention.
Figure 9C:
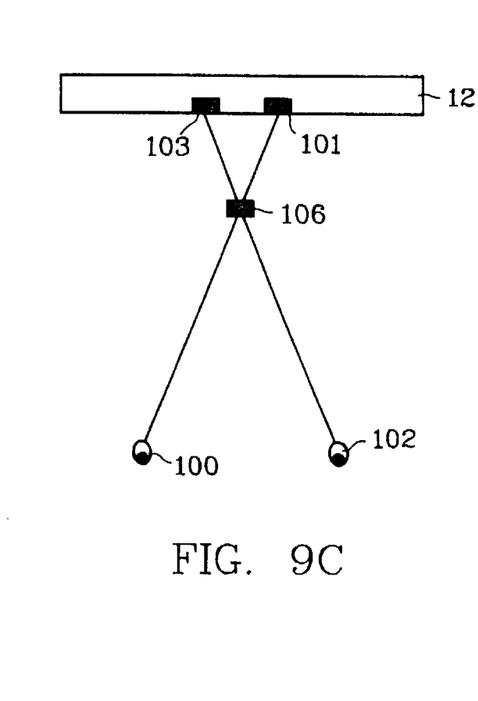
FIG. 9c illustrates a picture floating on a screen according to the present invention.

Referring to FIG. 9, it illustrates a stereo-picture according to the present invention; FIG. 9a illustrates a picture sunk into the screen, in which the left image 101 is set on the left side of the monitor 12, while the right image 103 is set on the right side of the monitor 12; consequently, the combined montage picture 106 by means of the left and right images is formed behind the screen of the monitor 12 to be seen by a user; the picture looks like sinking into the screen. FIG. 9b illustrates a picture projected on a screen, in which the left and right images are superimposed on the screen of the monitor 12, i.e., the stereo-montage-picture seen from the left side and the right side is projected and superimposed on the screen; in that case, a user can see the picture attached on the screen. FIG. 9c illustrates a picture being floating in front of a screen, while the left image 101 is set on the right side of the monitor 12, and the right image 103 is set on the left side of the monitor 12; in other words, a user can see the montage picture 106 set in front of the screen, being similar to float thereon.

Figure 10:
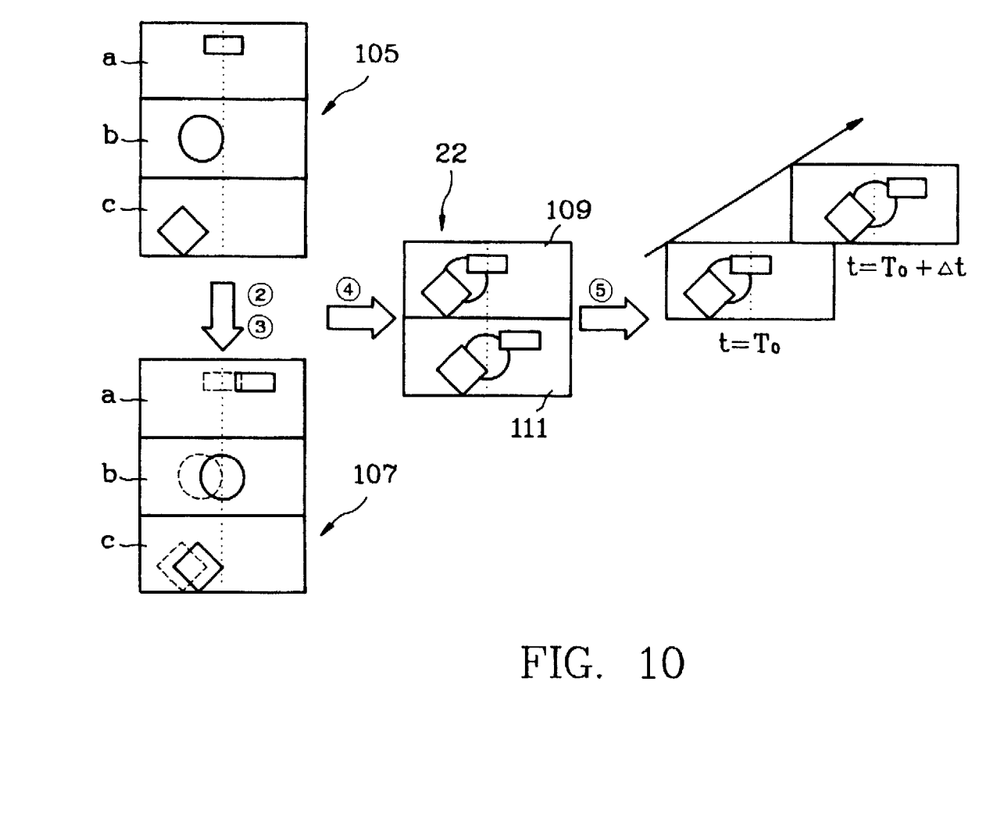
FIG. 10 illustrates a method of using a two-dimensional image to provide a vision having visual depth according to the embodiment of the present invention.

Referring to FIG. 10, it illustrates a method of using a two-dimensional image to provide a vision having visual depth; by means of the aforesaid method, a conventional two-dimensional and multi-layer plane image can be divided into different depths so as to have a user felt a new stereo effect; the method includes five steps, being described as follows:

(1) To prepare image:

First, store the data of a two-dimensional and multi-layer images in a main memory unit of a computer; suppose that the two-dimensional image has only, in terms of visual effect, three depth layers, i.e., a long range (first depth layer "a"), a middle range (second depth layer "b") and a short range (third depth layer "c").

(2) Duplicating images:

The image in every depth (referred to as depth layer image herein-after) will be duplicated in the memory unit of a computer so as to have all original depth layer images classified as the left image group 105, while the depth layer images duplicated are classified as right image group 107 (herein-after referred to as image group).

Figure 10A:
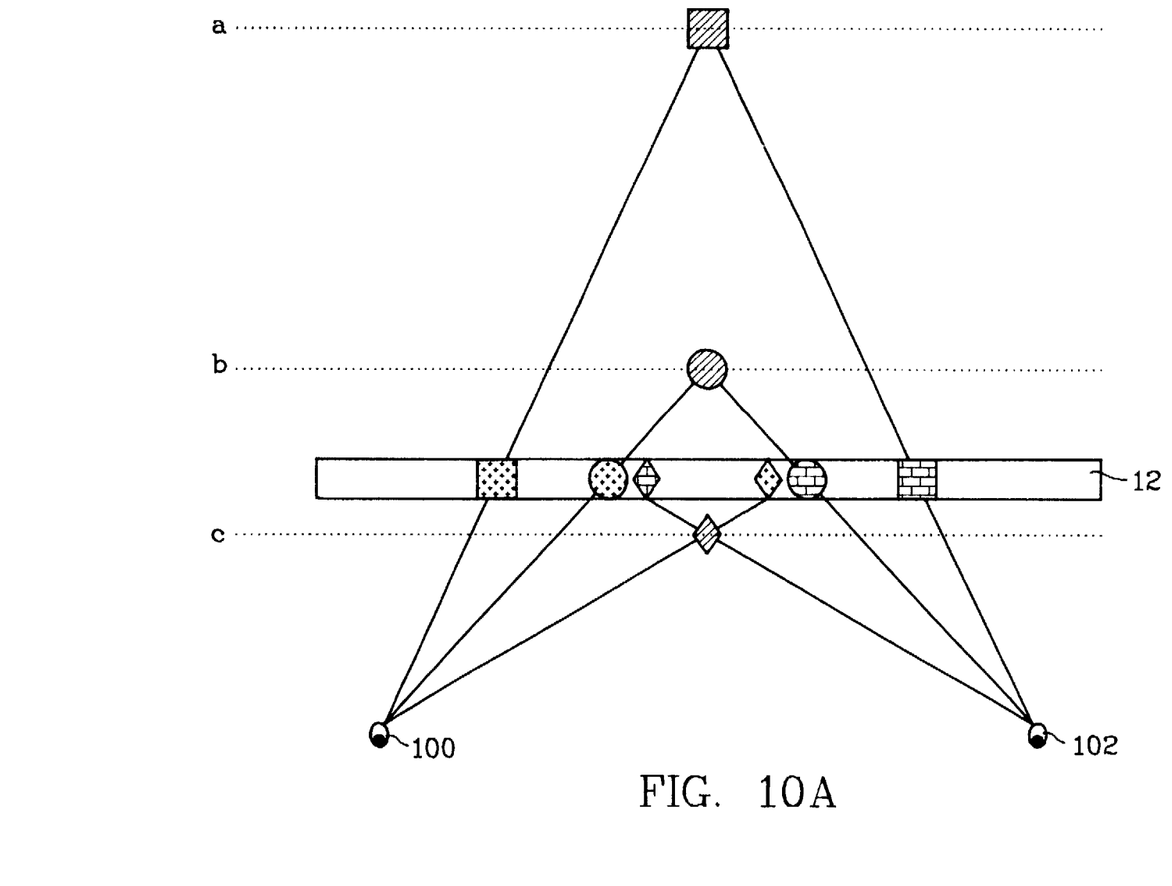
FIG. 10a illustrates a method of controlling two-dimensional pictures with multi-depth layer to provide a view having three-dimensional visual depth according to the embodiment of the present invention.
Figure 10B:
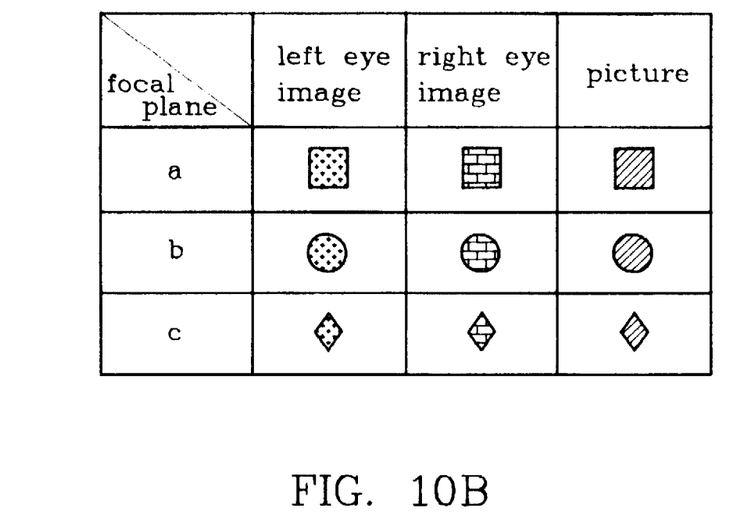

(3) Binocular Shift:

According the 3D depth operation method of the present invention, the images a, b and c in every depth layer of the right image group 107 (as shown with dotted line) will have a binocular shift so as to form into another right image group 107 (as shown with a solid line). The extent of the shift can be used for controlling the extent of the 3D depth of every image in terms of vision. As shown in FIG. 10a, it illustrates a 3D depth operation control; the left and right images on the first depth "a" (a square figure) has more binocular shift so as to have the left visual line (a line connected between the left eye and the image in left depth layer) and the right visual line (a line connected between the right eye and the image in right depth layer) intersected behind the screen of the monitor 12 (i.e., being sunk in the screen) so as to let the first depth "a" have more 3D depth. With the same processing method of the first depth layer "a", the images in the left and right depth layers (a circular figure) in the second depth layer "b" will have less binocular shift, and will also have the left and right visual lines intersected behind the screen of the monitor 12 (i.e., being sunk in the screen), but the second depth layer "b" will have less 3D depth. The images (diamond-shaped figure) on the left and right depths of the third depth layer "c" will have an opposite binocular shift, and therefore the left visual line and the right visual line are intersected in front of the screen of the monitor 12 (i.e., being floating in front of the screen); Therefore a user would feel, in visual effect, the image of the third depth layer "c" being floating out of the screen of the monitor 12. FIG. 10b illustrates the left and right images of FIG. 10a and the picture thereof.

(4) Combined depth layer image:

Let all depth layer images of the left image group 105 become superimposed as a picture, according to their distance relation, to form into a left image 109; simultaneously, all depth layer images of right image group 107 (solid line images) are superimposed as a picture, according to their distance relation, to form into a right image 111. Both the left and right images 109 and 111 are transmitted into the display memory of the VGA drawing card 22 at different addresses (i.e., non-interlace image output method); of course, the left and right images 109 and 111 can be interleaved first before being sent and stored at the same address in the display memory of the VGA drawing card 22 (i.e., an interlace image output method).

(5) Stereoscopic image output:

By means of the non-interlace or interlance image output method as mentioned in step 4, the left and right images 109 and 111 are sent to the monitor alternatively.

By means of the aforesaid steps and the hardware of the stereoscopic image system according to the present invention, the image on various depth layers attached to the screen will be separated at a regular distance to let a user feel a 3D and depth layer effect, i.e., looking like a vivid stereoscopic picture.

In brief, the present invention provides a stereoscopic software procedure in accordance with the binocular effect and the current two-dimensional image, i.e., without changing the software program of the two-dimensional image, and according to the stereoscopic procedures of the present invention, the two-dimensional images in all depth layers superimposed on a same plane can have a user felt a stereoscopic effect between depth layers by adjusting the position and the horizontal shift of the left and right images in different depths, and when a user puts on a LCD shutter eye-glass provided according to the hardware equipment of the present invention.

I claim:

1. A computerized stereoscopic image system comprising:

a main memory unit for executing various three-dimensional softwares, sending out a seperated left and right image data of a stereoscopic image, or for sending out an interleaved left and right image data;

a VGA drawing card for receiving an image data from said main memory unit, and after said image data being processed, said seperated left and right images being sent out a RGB analog image signal by using non-interlaced displaying method, or sent out a RGB analog image signal by using an interleave left and right images by means of an interlaced displaying method;

a monitor for receiving a RGB analog image signal out of said VGA drawing card, and displaying said image signal on a screen;

an external shutter synchronizer connected with a computer, and receiving an electrical signal out of said VGA drawing card, and then sending out a signal;

a wired LCD shutter eye-glasses for receiving, through wire, a signal out of said external shutter synchronizer, and furnishing a stereo-image for watching, or a wireless LCD shutter synchronizer for receiving, through wireless method, a signal out of said external shutter synchronizer, and furnishing a stereo-image for watching;

further wherein:

said external shutter synchronizer is a separated unit, or said synchronizer able to be installed in a main frame as well as a peripheral equipment, such as a drawing card, a mouse, a joy stick or a keyboard;

said synchronizer including: a power supply unit for providing said external shutter synchronizer with a D.C. power supply; a VGA interface buffer for isolating said VGA drawing card from said external shutter synchronizer in terms of electrical characteristics so as to prevent an output signal from said VGA drawing card from being interfered by said external shutter synchronizer to result in distortion; and said buffer able to receive a synchronous signal from said VGA drawing card and to amplify the same before being sent out; a shutter switch unit for receiving a signal out of said VGA interface buffer; said unit being classified into an automatic type and a manual type; a shutter controller for receiving output signals from said VGA interface buffer and said shutter switch unit, and by using said two signals to trigger said left and said right LCD shutters; a shutter-driving signal output unit for receiving an output signal from said shutter controller, and sending said signal to said wired LCD shutter eye-glasses or said wireless LCD shutter eye-glasses.

2. An external shutter synchronizer as claimed in claim 1, wherein said power supply unit including: a power supply circuit for receiving an external A.C. power, and reducing voltage thereof and rectifying the same to provide a D.C. power supply; a power supply switch being used as a switch for said D.C. power supply of said external shutter synchronizer, and also sending out a signal; a power supply indicator for receiving signal out of said power supply switch so as to indicate power supply condition.

3. A power supply unit as claimed in claim 2, wherein said power supply circuit is provided outside of said external shutter synchronizer for supplying D.C. power supply.

4. An external shutter synchronizer as claimed in claim 1, wherein said shutter switch unit including: a polarity setting circuit for setting a polarity state first, and sending out said polarity state; a polarity detector of vertical synchronous signal for receiving synchronous signals, which includes a vertical synchronous signal and a horizontal synchronous signal, from said VGA interface buffer and said polarity setting circuit, and detecting said vertical synchronous signal being positive or negative, and comparing with polarity pre-set in said polarity setting circuit, and sending out a result of said comparison; a polarity state indicator for receiving an output signal from said polarity detector of vertical synchronous signal so as to indicate existing polarity state; a shutter manual switch for directly controlling output or not of a LCD-shutter driving signal, and sending out a signal to show having output or not; a shutter state indicator for indicating using state of a stereoscopic eye-glasses.

5. An external shutter synchronizer as claimed in claim 1, wherein said shutter controller includes: a LCD-shutter driving signal generator for generating a square wave signal to drive said LCD shutter, and sending said signal; a halt-frequency reducer for receiving a vertical synchronous signal out of said VGA interface buffer, and reducing a half frequency of said signal, and then sending out said vertical synchronous signal at a half-frequency; a control circuit for receiving signals from said LCD-shutter driving signal generator and said half-frequency reducer, and for receiving output signal from said shutter switch unit, and to decide whether sending out a signal to drive said left and right LCD shutter or not.

6. A shutter-driving signal output unit as claimed in claim 5, wherein output of said LCD driving signal is sent to left or right side by using a wired transmitting method through a manual switch for left and right switching operation.

7. A shutter-driving signal output unit as claimed in claim 5, wherein output of said LCD driving signal is sent out through a wireless transmitting method, which including said wireless transmission switch, said transmitter state indicator, said amplifier, and said transmitter.

8. An external shutter synchronizer as claimed in claim 1, wherein a said LCD driving signal from said shutter-driving signal output unit is to be sent out by using a wired transmitting method and a wireless transmitting method, which including: a left-and-right switch for receiving a LCD-shutter driving signal out of said control circuit so as to switch a transmission to left or right said, and also sending said signal directly to said wired LCD shutter eye-glasses; a wireless transmission switch for receiving a signal out of said control circuit to control whether a vertical synchronous signal of said half-frequency reducer and a left and right LCD shutter driving signals are to be transmitted or not; and sending out a transmission signal thereof; a transmitter state indicator for receiving an output signal from said wireless transmission switch to show whether a vertical synchronous signal of said half-frequency reducer and driving signals of said left and right LCD shutters should be sent out or not; an amplifier for receiving an output signal from said wireless transmission switch, and amplifying said signal before sending out the same; and a transmitter for receiving an output signal from said amplifier, and converting said signal before sending to said wireless LCD shutter eye-glasses.

\* \* \* \* \*